United States Patent
Hasegawa et al.

(10) Patent No.: US 6,570,080 B1
(45) Date of Patent: *May 27, 2003

(54) METHOD AND SYSTEM FOR SUPPLYING CONTENTS VIA COMMUNICATION NETWORK

(75) Inventors: Yutaka Hasegawa, Hamamatsu (JP); Satoru Umezawa, Hamamatsu (JP); Hiroaki Takahashi, Hamamatsu (JP); Kosei Terada, Hamamatsu (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 25 days.

(21) Appl. No.: 09/574,550

(22) Filed: May 18, 2000

(30) Foreign Application Priority Data

May 21, 1999 (JP) ............................................ 11-142501
Sep. 21, 1999 (JP) ............................................ 11-267077

(51) Int. Cl.[7] .......................... G09B 5/00; G09B 15/04; G10H 1/26
(52) U.S. Cl. .......................... 84/609; 84/645; 84/477 R; 434/307 A
(58) Field of Search ................... 84/609–614, 634–638, 84/645, 477 R, 478; 434/307 A; 705/26, 27

(56) References Cited

U.S. PATENT DOCUMENTS 5,237,157 A    8/1993   Kaplan
5,636,276 A    6/1997   Brugger
5,918,213 A    6/1999   Bernard et al.

FOREIGN PATENT DOCUMENTS

| EP | 0 649 121 | 4/1995 |
|---|---|---|
| EP | 1012842 | 4/1999 |
| GB | 0012043.6 | 1/2001 |
| GB | 2 354 094 | 3/2001 |
| JP | 10-177381 | 6/1998 |
| JP | 10-275186 | 10/1998 |
| WO | WO 97/11450 | 3/1997 |
| WO | WO 00/27067 | 5/2000 |

OTHER PUBLICATIONS

"Music Provider Systems Get the Go Sign!", NIKKEI ELECTRONICS, Mar. 9, 1999, No. 738, pp. 87–111.

*Primary Examiner*—Stanley J. Witkowski
(74) *Attorney, Agent, or Firm*—Morrison & Foerster LLP

(57) ABSTRACT

The present invention is directed to a method and apparatus for making sample contents from music contents whereby server and user are connected with each other via a communication network, whereby the server supplies non-sample regular contents including at least performance information of a music piece and sound information pertaining to the music piece and sample contents including a sample of part of the non-sample regular contents. Thereafter, the user receives the sample contents and test-listens to the received sample contents. When the user has decided on acquiring the non-sample regular contents and performed a predetermined operation to acquire the contents, the non-sample regular contents are distributed from the server to the user via the communication network, at which time unique additional information, such as client information and serial number, is attached to the individual distributed contents.

6 Claims, 7 Drawing Sheets

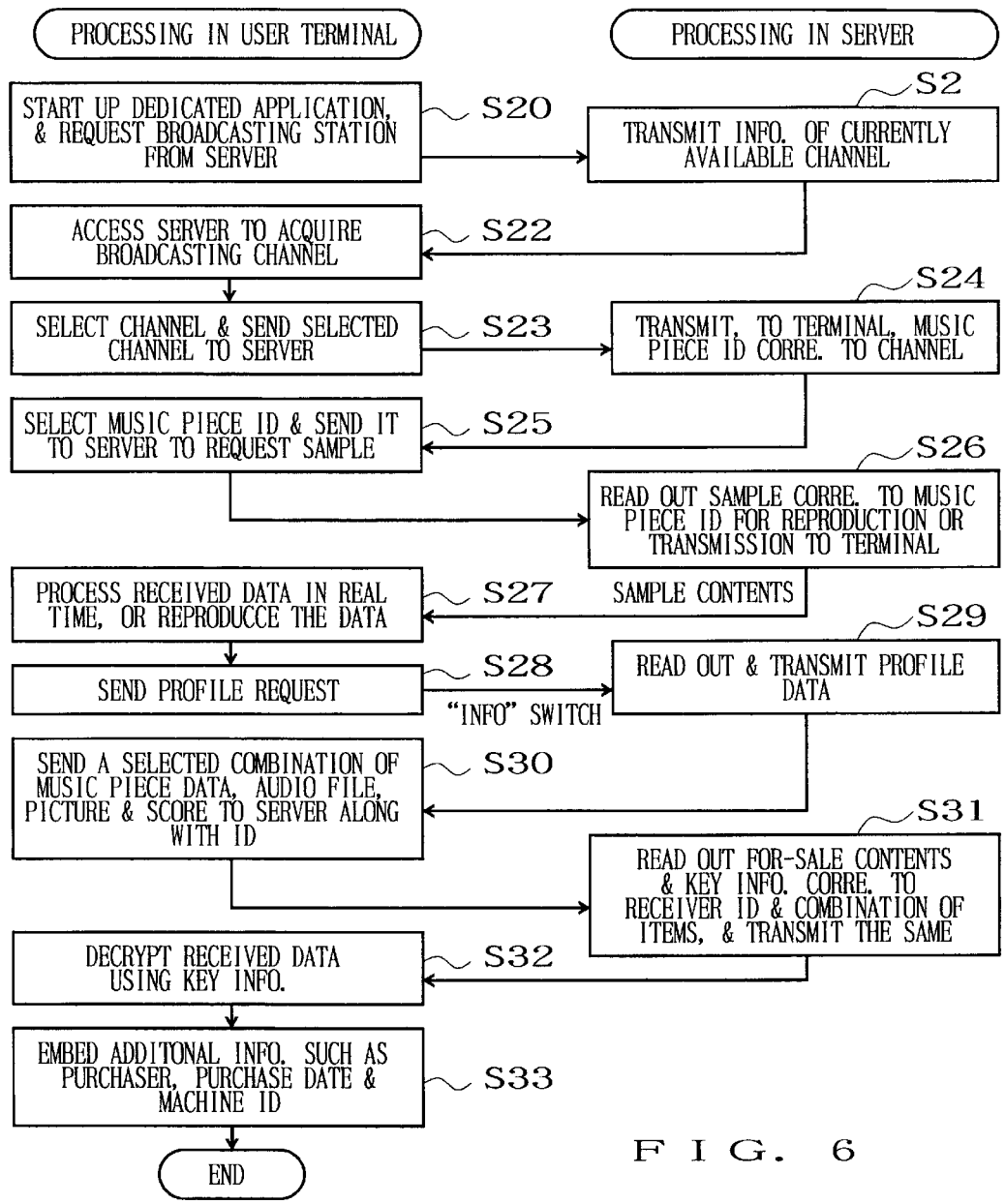
F I G. 6

METHOD AND SYSTEM FOR SUPPLYING CONTENTS VIA COMMUNICATION NETWORK

BACKGROUND OF THE INVENTION

The present invention relates to an improved method, system, apparatus and storage medium for supplying music-containing contents via a communication network, which are suitable for use in, for example, selling music contents on line via a communication network. The present invention also relates to a method, apparatus and storage medium for making sample contents from non-sample regular contents.

Among typical examples of music software on sale today are CD (Compact Disk) media where all performance sounds of a music piece, including musical instruments'performance tones and singing voice, are recorded in digitally encoded form using the well-known PCM (Pulse Code Modulation) scheme. Also on the market today are media which have recorded thereon music piece data in the form of digital performance information based on the MIDI (Musical Instrument Digital Interface) standard (MIDI music collection). To purchase a desired music software media, it has been conventional for any interested user to take the trouble to go to a store or shop selling the desired music software. In such a case, the user can not freely test-listen to the media itself to ascertain what the recorded music piece is like; at the best, the user is allowed to just listen to a sample media of a limited music piece previously provided for test-listening purposes in the store or shop.

In the field of the so-called "communication karaoke", it has been customary to transmit or distribute karaoke software, in the form of MIDI performance information, to a requesting terminal via a communication network. However, to date, there has been no system or technique which allows a private user to freely access the communication network in order to purchase desired music piece data and thereby allows the user to test-listen to a desired music piece prior to purchase or other form of acquisition of the desired music piece. Besides, the network-based distribution has heretofore been limited to karaoke music pieces. With the recent widespread use of the Internet, new systems have been brought into partial operation, by which music piece data in the form of MIDI information are distributed, in response to a request given by a client (or client station), from a server by way of the Internet. For example, Internet broadcasting stations have come on the scene as a new form of program suppliers that differ from the traditional mass media facilities such as radio and television broadcasting stations. These Internet broadcasting stations are intended to distribute music programs via a communication network in response to a request from an interested user or audience. More specifically, in response to a user's request, given via a user terminal (client station) such as a personal computer (PC), each of the Internet broadcasting stations connects to a WWW (World-Wide Web) server by way of a communication network such as the Internet and receives a program made up of music piece data and/or video (picture) data, to thereby allow the client station to reproduce the requested program based on the received data.

Of a great number of music software being presently marketed, there may be some which can be supplied to every interested person on a free-of-charge basis. But, because the music piece data in the form of MIDI performance information generally have economic values by themselves, it is not desirable to allow every interested person to unlimitedly download the music piece data via an Internet broadcasting station of the above-mentioned type. For this reason, a new form of music-software- or contents-selling system has been proposed which sells desired software or contents using an Internet broadcasting station or similar system to distribute, to the client station, music piece data in the form of MIDI performance information in response to a purchase request from the client station. However, the proposed contents-selling system using a communication network has various problems, for example, as to how to permit test-listening by a user and how to cope with unauthorized copying of the contents after sale, and no sufficient countermeasures or solutions to these problems have ever been provided. For instance, if the test-listening facility is not sufficient, then there would arise the problem that users are not effectively motivated to purchase contents because details of the contents remain unknown without sufficient test-listening or users tend to suffer unexpected inconveniences if they purchase the contents without knowing details thereof. Another problem is how to give assurances or protection to contents purchased by a user downloading the contents; that is, it is necessary to devise a good way to provide after-sale assurances, such as maintenance services, to the user. Further, there is a need for arrangements to readily protect the copyright holder and the like from a flood of unauthorized copying. Thus, these problems remaining to be solved are preventing an increase in the number of people who are willing to supply this type of novel contents selling system with contents for sale (for-sale contents or non-sample regular contents) as well as in the number of users willing to purchase the contents using the system, and thus the problems result in one of significant factors preventing a proliferation of the contents selling system that should be an easy-to-handle system by nature.

SUMMARY OF THE INVENTION

It is therefore an object of the present invention to provide a novel technique which is suitably applicable to a system for supplying music-containing contents via a communication network and which can greatly promote use of the system while providing for conveniences and protection of both of content suppliers and users (purchasers). For example, the novel technique of the present invention can be suitably used to construct a method or system which can greatly improve the construction of contents to be sold and thereby effectively arouse users'desire to purchase the contents and which are yet easy to use. The novel technique of the present invention can also be used suitably to construct a method or system which is useful in giving after-sale assurances and protection to contents sold to a user.

It is another object of the present invention to provide a method and apparatus which can make sample contents from non-sample regular contents.

In order to accomplish the above-mentioned objects, the present invention provides a method of supplying music-containing contents via a communication network, which comprises the steps of: supplying non-sample regular contents including at least performance information of a music piece and sound information pertaining to the music piece; supplying sample contents including a sample of part of the non-sample regular contents; receiving, via the communication network, the sample contents for trial use by a user; and distributing, via the communication network, the non-sample regular contents to the user in response to a request for contents acquisition given by the user, and when the user acquires the non-sample regular contents, attaching unique additional information to the non-sample regular contents so that the unique additional information is supplied to the user along with the distributed non-sample regular contents.

According to the present invention, the non-sample regular contents are constructed to include not only performance information (e.g., MIDI performance information) of a music piece but also at least sound information pertaining thereto, and thus the contents can be significantly diversified. As a consequence, where the present invention is applied to an on-line music-content selling system, the present invention can effectively arouse users' desire to purchase the contents and thereby promote use of the selling system. For example, the sound information may include various types of PCM-coded audio signals which typically represent singing voice and/or chorus voice constituting a part of the music piece, commentary voice or the like related to the music piece. The non-sample regular contents may further include video information of a musical score and other suitable picture information. Further, in the present invention, trial or sample contents including a partial sample of the non-sample regular contents are supplied separately from the non-sample regular contents and the user is allowed to receive and readily effect test-listening or the like on the received sample contents. Thus, the present invention can effectively motivate the user to acquire the contents and establish a system for the user to ascertain actual details of the desired contents, so that the contents can be easier for the user to use. Furthermore, the present invention is characterized by the arrangement that once the user finally decides on acquiring the contents, not only the contents are distributed to the user via the communication network but also unique additional information attached to the contents is supplied to the user. By determining the presence of the unique additional information, the present invention can readily guarantee the distributed contents as duly authorized contents; that is, the present invention can readily give the user after-sale assurances such as maintenance services. If a simple unauthorized copy of the contents sold to the user is found, the present invention can accurately identify the authorized purchaser (user) by determining the presence of the unique additional information attached only to the legally purchased contents, and also effectively protect the content supplier and copyright holder etc. from a flood of unauthorized copies. Further, even in the case where some contents stored in the server are stolen by an illegal hacker or the like, or where an unauthorized copy, obtained as by illegally copying purchased contents with the additional information unduly removed from the purchased contents, is found, the present invention can promptly recognize the illegality of the copy by determining that the copy does not have the unique additional information attached thereto, which can also be useful in protecting the rights of the content supplier and copyright holder etc.

According to another aspect of the present invention, there is provided a method of making sample contents from music contents including at least a file of digital performance information for automatically performing a music piece and a file of sound information contained in the music piece, which is characterized by the steps of: a first step of analyzing the digital performance information for a performance pattern present therein and dividing the digital performance information into a plurality of segments in accordance with the performance pattern; a second step of detecting an envelope in the sound information and dividing the sound information into a plurality of segments on the basis of a tendency of rising/falling variations in the detected envelope; a third step of comparing the segments of the digital performance information and the segments of the sound information, to thereby determine a given range of the music piece which is to be extracted as characterizing the music piece; and a fourth step of extracting specific parts of the digital performance information and sound information which correspond to the given range of the music piece determined by the third step and supplying the extracted specific parts as sample contents.

With the method of the invention arranged in the above-mentioned manner, it is possible to automatically determine a given range of the music piece to be extracted as characterizing the music piece, taking into account both the digital performance information of the music piece and the sound information (singing voice or chorus voice), with the result that sample contents can be made with utmost ease and efficiency.

The present invention may be constructed and implemented not only as the method invention as set out above but also as a system or apparatus invention. The present invention may also be embodied as a program for execution by a processor such as a computer or DSP, and as a storage medium storing such a program. Further, the present invention may be implemented as a method, apparatus, program or storage medium for separate application to a server on a communication network. Similarly, the present invention may be implemented as a method, apparatus, program or storage medium for separate application to a client on a communication network. Further, the processor for use in the present invention may be implemented not only by a general-purpose processor capable of executing software programs but also by a dedicated hardware processing device constructed of integrated or other electric/electronic circuitry.

BRIEF DESCRIPTION OF THE DRAWINGS

For better understanding of the object and other features of the present invention, its preferred embodiments will be described in greater detail hereinbelow with reference to the accompanying drawings, in which:

FIG. 6 is a flow chart outlining processing performed bidirectionally between the user terminal and the server in the embodiment;

DETAILED DESCRIPTION OF THE PREFERRED EMBODIMENTS

Figure 1:
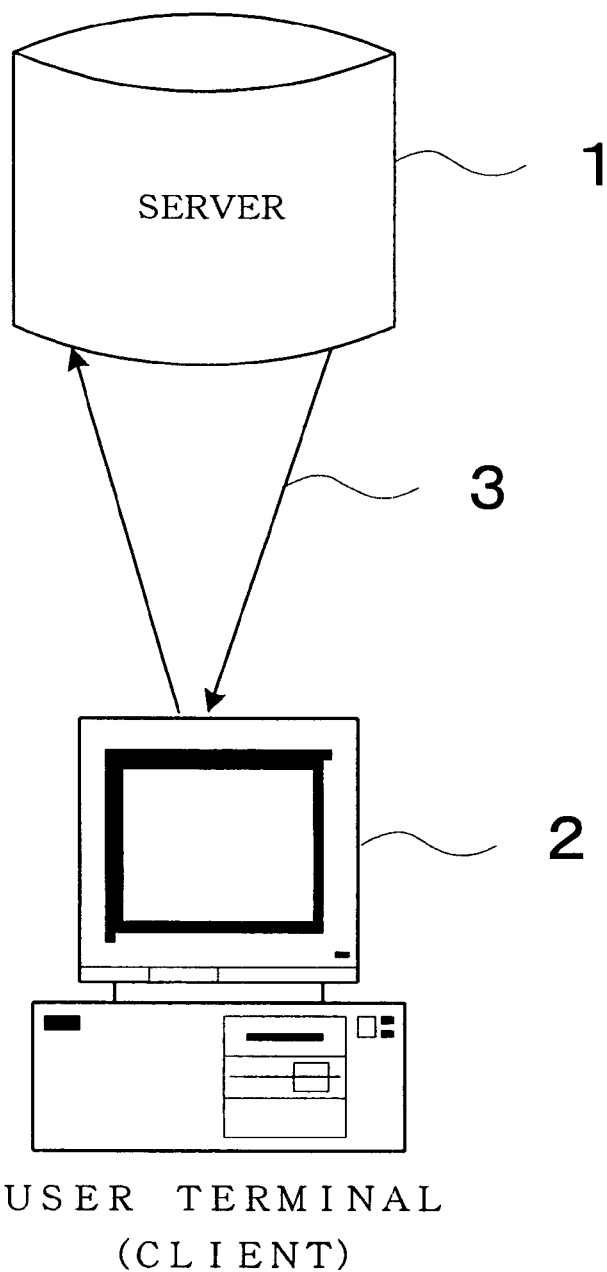
FIG. 1 is a block diagram schematically showing an general system organization in accordance with a preferred embodiment of the present invention.

FIG. 1 is a block diagram schematically showing a general system organization in accordance with a preferred embodiment of the present invention, where a server 1 supplying contents and a user terminal (client or client station) 2 are interconnected via a communication network 3 for bidirectional communication therebetween. The communication network 3 employed in the present invention may be a wireless (radio) communication network, such as one using a satellite, rather than a wired communication network. Further, the communication network 3 may be a public telephone line network, the Internet, a LAN (Local Area Network) or the like. The system of the present invention may include two or more content serving sites or servers 1 rather than just one server 1, and each of the servers 1 may be arranged to supply contents previously provided therein in an independent fashion; of course, each of the servers 1 includes a server computer equipped with programs necessary for carrying out various processing according to the present invention and a database having prestored therein a multiplicity of contents. The user terminal (client station) 2 may comprise an ordinary general-purpose personal computer, or a microcomputer or processor incorporated into equipment, such as an electronic musical instrument, having some dedicated functions to carry out the various processing according to the present invention. It should be obvious that dedicated application software is installed previously in the user terminal (client station) 2 so that the user terminal 2 is able to carry out the various processing according to the present invention as will be described hereinbelow as a preferred embodiment of the present invention. Although not specifically illustrated, each of the computers in the server and client station includes a processor capable of executing given software programs and a display, keyboard, hard disk device and other peripherals connected to the processor.

Figure 2:
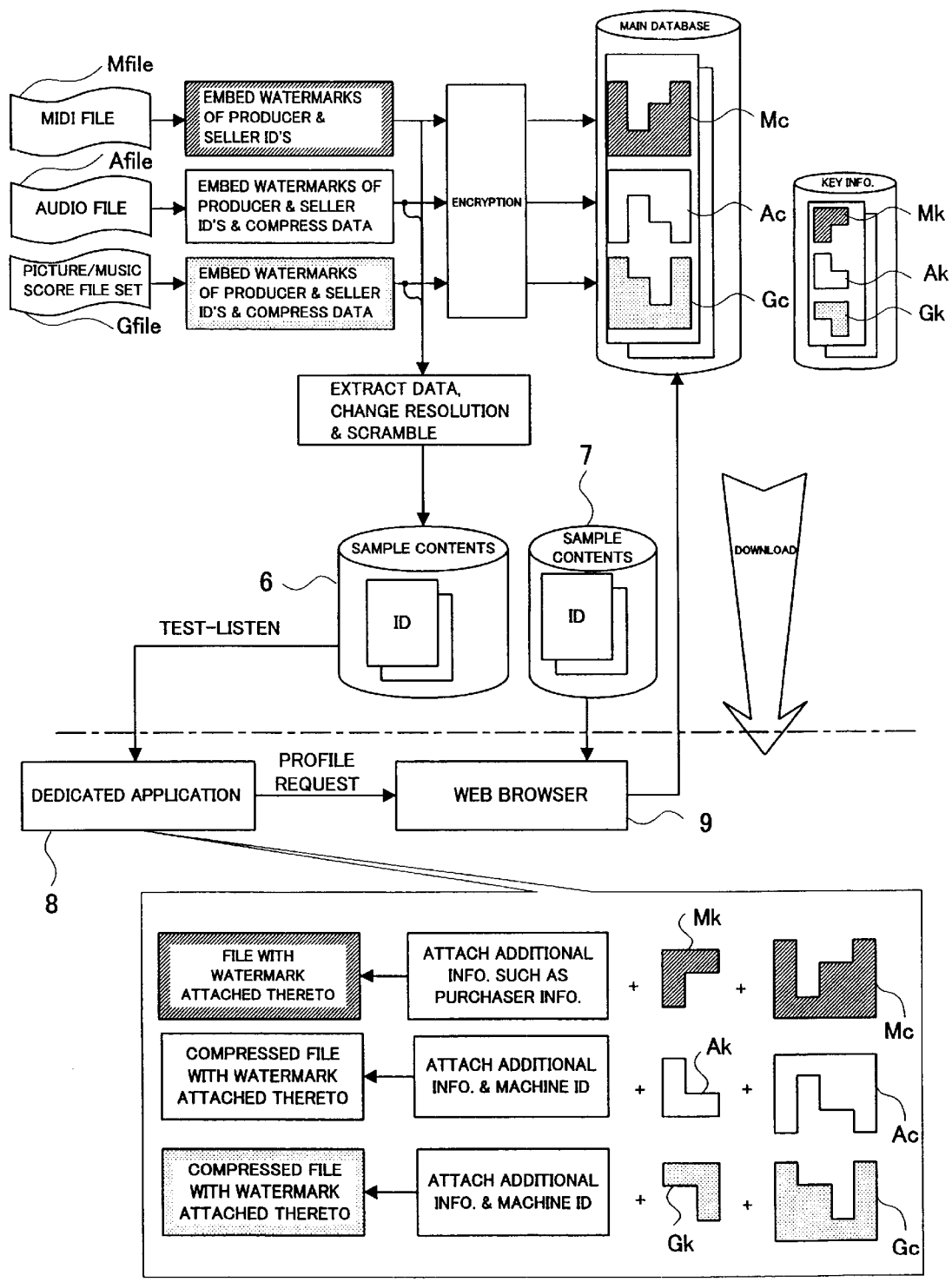
FIG. 2 is a block diagram schematically showing exemplary manners in which a server prepares contents and in which information is exchanged between the server and a user terminal.

FIG. 2 is a block diagram schematically showing exemplary manners in which the server 1 prepares contents to be distributed and in which information is exchanged between the server 1 and the user terminal 2. First, a description will be given about "non-sample regular contents" that are prepared by the server 1 and can be sold, as "for-sale contents" to any interested user in the described preferred embodiment. However, the contents supplying technique proposed by the present invention is extensively applicable to various cases where music-containing contents are distributed from a selected server to a requesting user (client) on a charged or free-of-charge basis; that is, the present invention of course embraces, in its scope, even an embodiment where contents are distributed to and acquired by a user on a free-of-charge basis.

Each set of non-sample regular contents (i.e., for-sale contents) corresponding to a single piece of music includes a file of MIDI performance data (digital performance information for an automatic performance based on the MIDI standard) (hereinafter called a "MIDI file") Mfile of the music piece, a file of sound information (hereinafter an "audio file") Afile pertaining to the music piece, and a picture/musical score file set Gfile also pertaining to the music piece. Although not specifically shown in FIG. 2, the audio file Afile includes intra-music sound information constituting at least a part of the music piece (typically, sound waveform data of singing voice and/or chorus voice or special effect sound difficult to express in the MIDI format), and commentary voice information (also in the form of sound waveform data), such as MC (Master of Ceremonies)'s voice, pertaining to the music piece. It should also be obvious that the intra-music sound information included in the audio file Afile is reproduced, during reproduction of the music piece, in synchronism with the MIDI performance data. Further, the commentary voice information in the audio file Afile may be automatically reproduced in accordance with a predetermined reproducing sequence at appropriate points, such as before or after or during the music piece reproduction, or reproduced by being retrieved independently, whenever necessary, in response to a user's selection or the like.

It should also be appreciated that the above-mentioned sound waveform data may be digitally encoded by any other suitable scheme than the PCM, such as the DPCM, ADPCM or other suitable data compression scheme. The commentary voice may be one commenting on the music piece just like a disk jockey of a radio program or in any other suitable fashion. Further, the picture/music score file set Gfile includes a plurality of picture files, such as a picture file for providing a background picture and explanatory picture to be visibly shown, during reproduction of the contents in question, on a video display of the user terminal 2 and a music score file for displaying the music score of the music piece. These picture files too may be automatically reproduced in accordance with a predetermined reproducing sequence at appropriate points, such as before or after or during the music piece reproduction, or reproduced by being retrieved independently, whenever necessary, in response to a user's selection or the like. Of course, the picture files may comprise data of either or both of moving and still pictures.

Figure 3:
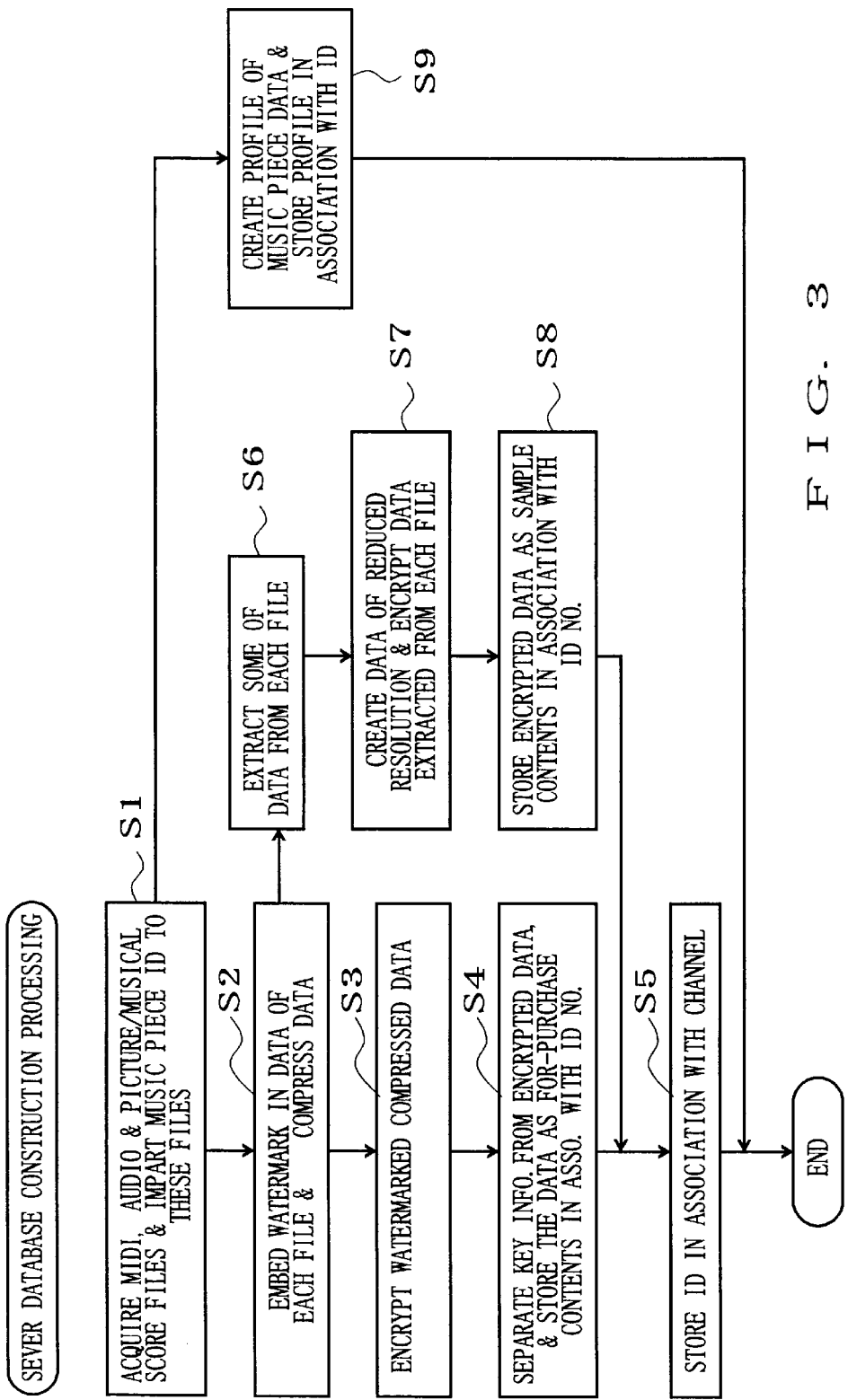
FIG. 3 is a flow chart illustrating an operational sequence of processing for constructing a server database in the embodiment.

For a given music piece, a plurality of different types of files Mfile, Afile and Gfile as described above are first created, and then for-sale contents and sample contents are created on the basis of the created files Mfile, Afile and Gfile and then stored into a database. FIG. 3 is a flow chart illustrating an operational sequence of processing for constructing such a database. Keyboard, mouse, display, memory, etc. belonging to a computer are used as appropriate in making these contents. In FIG. 3, the individual created files Mfile, Afile and Gfile of the given music piece are retrieved and assigned a common music piece ID (Identification code) that is unique to the music piece, at first step S1. Then, at next step S2, various items of electronic signature information, indicative of the copyright holder, producer, seller, etc. of the music piece, are embedded, as "electronic watermark" information, in respective appropriate regions of the individual files. Also, at step S2, a predetermined data compression operation is performed on the audio file Afile and picture/music score file set Gfile each having a relatively great quantity of data. At following step S3, the data of the individual files, having undergone the watermark embedding and data compression operations, are collectively subjected to a predetermined encryption operation.

Next, at step S4 of FIG. 3, key information is separated from the encrypted data of the individual files, so as to create a main section Cc of the for-sale contents including the encrypted MIDI file Mc, encrypted audio file Ac, encrypted picture/music score file set Mk, and a key information section Ck of the for-sale contents including audio file key information Ak and picture/music score file key information Gk (see FIG. 2). The thus-created main section Cc of the for-sale contents is then stored into a main database 4 of the server 1 in association with the ID of the music piece in such a manner that it can be read out from the database 4 in response to designation of the music piece ID. The key information section Ck of the for-sale contents is stored into a key database 5 of the server 1 in association with the ID of the music piece in such a manner that it can be read out from the database 5 in response to designation of the ID. In the above-described manner, the for-sale contents of each music piece are divided into the main section Cc and key information section Ck, and the thus-divided main section Cc and key information section Ck are then stored into the respective databases 4 and 5 for subsequent management using the music piece ID.

Namely, according to the present invention, the for-sale contents of each music piece are made up of the main and key information sections Cc and Ck, and security measures are made only about the main section Cc against unauthorized reproduction. More specifically, even when the main database 4 is accessed by a hacker or the like without a due authorization or when some data are stolen during downloading on the communication network, the above-described security measures work to reliably prevent the music piece from being readily reproduced unless the hacker or the like obtains a complete combination of the necessary data. The above-described watermark embedding operation of step S2 and encryption process of step S3 also serve as the security measures.

At that time, the music pieces are classified according to predetermined broadcasting channel and also managed on a channel-by-channel basis so that guide information on the music pieces belonging to any one of the broadcasting channels can be read out from the databases 4 and 5 in response to designation of that channel. Namely, at step S5, the IDs of the individual music pieces are each stored into a table or the like in association with the channel which the music piece belongs to. Thus, in response to user's designation of the broadcasting channel, a list of the for-sale contents of the music pieces belonging to the channel can be transmitted to the user. Note that the terms "broadcasting channels" are used herein to refer to content supply sources that are classified into a plurality of channels, just as in the case with ordinary radio and television broadcasting stations, so that users can readily select any desired contents. For example, the channel classification may be made according to any of various standards, such as by the musical genre, player, record company or producing agency. Of course, one server may correspond to a plurality of broadcasting channels or to a single broadcasting channel.

The following paragraphs describe creation of the trail or sample contents. Namely, at step S6 of FIG. 3, some of the data of the individual files, having undergone the watermark embedding and data compression operations at step S2 above are selectively extracted as sample data from which sample contents are to be created. At following step S7, the extracted data of predetermined ones of the files are subjected to an operation for reducing the data resolution, and a predetermined encryption process is performed on the data of the individual files. This encryption process of step S7 is also intended to serve as security measures but may be simpler than the encryption process performed at step S3 for the for-sale contents, due to the trial purposes of the sample contents. Further, the data resolution reduction may be performed, for example, by lowering the sampling rate of the audio file and lowering the resolution (dpi: dots per inch) of the picture/musical score file set. This is because the audio file and picture/musical score file set tend to have a relatively great quantity of data and thus it is better to decrease the total data quantity in the entire sample contents by reducing the data of the audio file and picture/musical score file set. Because of the nature of the sample contents, a certain degree of resolution reduction is considered to be safely allowable in the described preferred embodiment. With such novel arrangements, the preferred embodiment of the invention will achieve an enhanced efficiency of data transfer via the communication network.

Then, at step S8 of FIG. 3, the extracted data of the individual files, having been encrypted at step S7 above, are stored, as sample contents, into a sample content database 6 of the server 1 in association with the ID of the music piece. After that, the above-described operation of step S5 is performed, so that the ID and channel of the music piece are associated with each other for the sample contents thus stored in the sample content database 6. Thus, in response to user's designation of the broadcasting channel, a list of the sample contents of the music pieces belonging to the channel can be transmitted to the user.

Further, the following paragraphs set forth an exemplary manner in which the data of the individual files are selectively extracted at step S6 for use as sample content data. For test-listening by a user, it is desirable to extract performance data of a particular range of the music piece that appears to most strongly characterize the music piece and thus gives the user the strongest impression of the music piece. For that purpose, it is important to appropriately extract or cut out the performance information from the MIDI file and cut out the intra-music sound information from the audio file. Thus, with reference to FIGS. 4 and 5, a description will be made about an exemplary manner in which sample contents are made from the extracted information of non-sample regular contents or for-sale contents.

Figure 4:
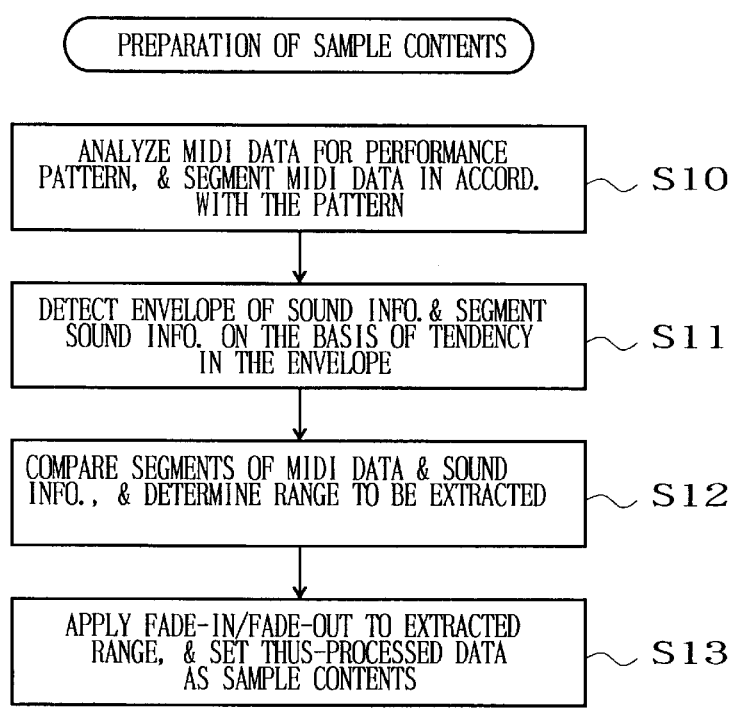
FIG. 4 is a flow chart showing an exemplary manner in which sample contents are made in the embodiment.

At step S10 of FIG. 4, the performance data of the MIDI file are analyzed to detect performance patterns present therein, and the performance data sequence is divided into a plurality of segments, such as by the measure or segment where specific repetitive patterns are likely to occur. For example, it is very likely that those segments where similar performance patterns occur at given time intervals or in succession are, in most cases, a "bridge" portion or highly characteristic portion of the music piece, and thus the division or segmentation based on the performance pattern detection is considered to be very useful. Note that the performance pattern detection and subsequent division may be performed by designating a desired sample-content reproducing time and using a time length, corresponding to the designated reproducing time, as a minimum unit time for the performance pattern detection and division.

At next step S11, detection is made of an envelope of the intra-music sound information (representing for example singing voice and/or chorus voice) included in the audio file, and the intra-music sound information is divided into a plurality of segments on the basis of a tendency of rising/falling variations in the detected envelope. Because the envelope of the singing voice represents a feel of existence corresponding more or less to a climax or bridge portion of the performance, it can become a good reference for finding an important portion of the music piece.

At following step S12, a range within the music piece which is to be extracted as a strongly characterizing portion (e.g., bridge portion) of the music piece is determined by comparing the respective segments of the MIDI data and sound information divided at the above steps. In this case, it is not always necessary to segment both the MIDI data and the sound information; that is, if an important characterizing portion of the music piece is clearly identifiable by only segmenting one of the MIDI data and the sound information, that portion may be determined directly as the range to be extracted. For example, in a situation where similar performance patterns occur at given time intervals in a particular range of the MIDI data and the particular range corresponds to the bridge portion, that range may be determined as the range to be extracted. Alternatively, a representative pattern may be extracted on the basis of similarity/dissimilarity between the patterns of the individual divided segments of the MIDI data (e.g., repeatedly appearing patterns may be determined as the representative pattern) and a representative envelope section (e.g., a section representing a climax portion of the music piece) may be extracted on the basis of respective envelope tendencies of the individual divided segments of the sound information. In this case, the to-be-extracted range of the music piece may be determined such that it includes a region where the representative pattern and representative envelope section overlap each other.

Figure 5:
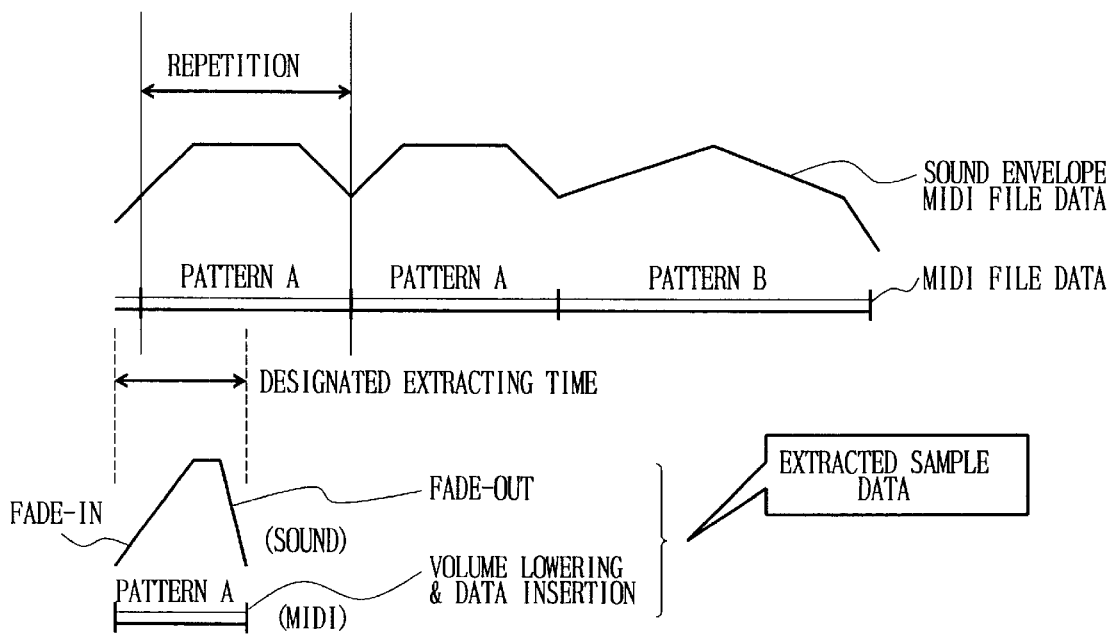
FIG. 5 is a diagram showing an exemplary manner in which a sample range to provide sample contents is extracted on the basis of relationship between patterns in a sound envelope and a MIDI file.

Part (a) of FIG. 5 schematically shows exemplary patterns in the sound envelope and MIDI file. Here, pattern A occurs repetitively and a first occurrence of pattern A corresponds to a climax portion of the sound envelope and thus is determined as the to-be-extracted range. In the illustrated example of part (a) of FIG. 5, an extracting time length is also designated so that a limited range corresponding to the designated extracting time length is further extracted out of the determined to-be-extracted range.

Further, at step S13, the data of the portion corresponding to the determined to-be-extracted range are taken out from each of the MIDI and audio files, and information processing is carried out to effect fade-in and fade-out operations in correspondence with the adjoining start and end of each of the segments. Consequently, at step S13, the data having undergone the information processing are provided as trail or sample contents. Part (b) of FIG. 5 is explanatory of the details of the fade-in and fade-out operations. As shown, fade-in and fade-out envelopes may be imparted to the sound information (audio signal) and data instructing a volume increase (volume-up) and volume decrease (volume-down) may be inserted in the MIDI data. Other suitable information processing operations may be performed here at step S13 in addition to the fade-in and fade-out.

As for the picture/musical score file set, musical score data, corresponding to the range extracted from each of the MIDI and audio files as sample contents, are extracted from the set. Also, if any, a picture segment corresponding to the extracted range may be extracted from the set; if not, an appropriate picture segment not corresponding to the extracted range may be extracted from the set. Further, an indication such as "SAMPLE" may be inserted in the sample content data of the picture/musical score file set, so as to indicate, during reproduction of the sample contents, that the sample contents are being currently reproduced. Furthermore, the sample picture may be reduced in size. Moreover, any appropriate segment of the commentary voice in the audio file may be extracted; if unnecessary, no segment of the commentary voice may be extracted. Then, the partially-extracted data of the individual files are stored together into the database 6 as a sample file in the above-mentioned manner. As another way of extracting the sample contents, sample content data may be extracted from where the watermark information has been embedded at step S2.

As noted above, the preferred embodiment can automatically determine the to-be-extracted range characterizing the music piece in question taking into account both the digital performance information and the sound information (singing voice or chorus voice) of the music piece, and also create trial or sample contents with utmost ease and efficiency.

Referring back to FIG. 2, a profile server 7 stores therein profile information (such as the name, musical genre, player, producer, label, file type, playing time, purchase and price) of each individual music piece stored in the above-mentioned databases 4, 5 and 6, in association with their respective IDs. As shown at step S1 of FIG. 1, the files Mfile, Afile and Gfile of a desired music piece is acquired, and then the operation of step S9 is performed to make profile information of the acquired music piece, so that the thus-made profile information is stored into the profile server 7 in association with the music piece ID. This way, in response to designation of the ID of any desired music piece, the main section Cc and key information section Ck of the for-sale contents, sample contents and profile information can be read out from the respective databases 4–7.

Next, a description will be made about processing performed in the user terminal (client station) 2 along with processing performed in the server 1 in response to the processing in the user terminal 2. As shown in FIG. 2, the user terminal 2 is provided with dedicated application software 8 for carrying out various processing according to the present invention, as well as a WEB browser for Internet communication. Of course, the user terminal 2 also has various other functions necessary for implementing the present invention, such as a function to audibly reproduce sound data and a function to reproduce video data on an electronic display and/or printer. Outline of the processing performed in the user terminal 2 in accordance with the dedicated application software 8 is illustrated in the left half of FIG. 6. Illustrated in the right half of FIG. 6 is the processing performed in the server 6 in response to the processing in the user terminal 2.

Once the dedicated application software 8 is started up in the user terminal 2, the user terminal 2 requests a desired broadcasting channel from the server 1 at step S20. At the same time, an operation panel as shown in FIG. 7 is displayed in an appropriate section of the display provided in the user terminal 2.

In response to the request from the user terminal 2, the server 1 transmits, to the user terminal 2, information indicative of currently available broadcasting channels, such as the musical genres and producer of music pieces belonging to the broadcasting channels, at step S21. The user terminal 2, at step S22, receives the information of the currently available broadcasting channels transmitted from the server 1.

Figure 7:
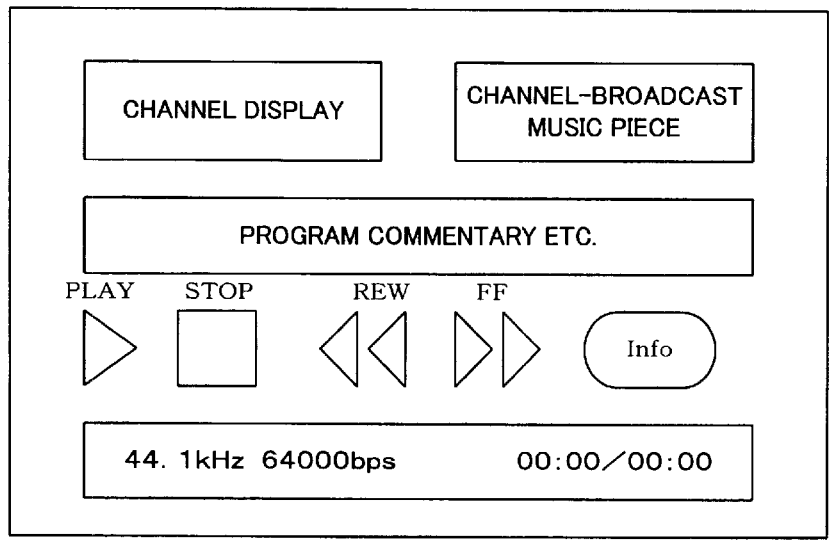
FIG. 7 is a diagram showing an example of an operation panel provided in the user terminal.

"channel display" area on the operation panel of FIG. 7 is provided for displaying the respective names (or names of the sites or channels or channel numbers) of the currently available broadcasting channels, to allow the user to select a desired one of the broadcasting channels. For instance, placing the mouse pointer on this channel display area can list up the currently available broadcasting channels and the user is allowed to select or change a desired one of the listed broadcasting channels by clicking the desired broadcasting channel, so that information indicating the thus-selected broadcasting channel is sent to the server 1, at step S23. In response to this, the server 1, at step S24, transmits to the user terminal 2 the IDs of a plurality of music pieces associated with the selected broadcasting channel. At the same time, the server 1 supplies, by collective downloading or successive data-stream downloading, the user terminal 2 with voiced commentary on a catalog of the music pieces, background music (BGM) intended to raise the feel of the commentary and/or the like previously provided in the server in association with the selected broadcasting channel. The commentary voice and background music are then audibly reproduced in the user terminal 2. Thus, the user can listen to the commentary voice and background music in a relaxed atmosphere as if he or she were listening to the radio. In a "program commentary etc." area on the operation panel of FIG. 7, there are displayed a commentary introducing programs previously provided in the selected broadcasting channel.

Further, in a "channel-broadcast music piece" area on the operation panel of FIG. 7, there are displayed various options for the music pieces selectable on the selected broadcasting channel, on the basis of the music piece IDs transmitted from the server 1 in response to the selection of the broadcasting channel. For instance, placing the mouse pointer on this channel-broadcast music piece area can list up the selectable music pieces and the user is allowed to select a desired one of the listed music pieces by clicking the desired music piece, so that the ID of the selected music piece is sent back to the server 1, at step S25. Here, the music piece selection corresponds to a request for a desired sample, i.e., corresponds to selection of desired sample contents; in this case, a plurality, rather than just one, of the selectable music pieces may be selected together at one time.

Then, in response the music piece ID thus selected by the user (selection of desired sample contents), the server 1 reads out, from the sample content database 6, particular sample contents corresponding to the user-selected music piece ID, and transmits to the user terminal 2 the readout sample contents either after reproducing the same or directly in the file format. More specifically, in the case where the sample contents are to be transmitted to the user terminal 2 after reproduction in the server 2, the server 1 transmits the contents in successive data streams, and the user terminal 2 audibly reproduces and visually displays, in real time, the reproduced data of the sample contents having been transmitted in streams from the server 1 (step S27). In the case where the sample contents are to be transmitted to the user terminal 2 directly in the file format, on the other hand, the user terminal 2 downloads the sample contents from the server 1 into its memory and then audibly reproduces and visibly displays the sample contents while decrypting the data of the individual files (step S27). In this way, the user can listen to a part of (i.e., partial sample of) for-sale contents by means of the reproduction of the sample contents. In test-listening reproduction, various other information indicative of a sampling frequency applied to the sound information, speed of communication with the network, playing time length, etc. of the music piece may be displayed in a predetermined area near the lower end of the operation panel of FIG. 7. The downloaded sample contents are stored into a buffer when the dedicated application software 8 is running, so that the contents can be reproduced any desired number of times. In such a case, the reproduction of the contents can be started or stopped by activating a replay button PLAY or stop button STOP provided on the operation panel of FIG. 7, or fast-forwarded or fast-rewound (fast-reversed) to a desired location by activating a fast-forwarding button FF or fast-rewinding button REW. Further, a desired reproducing sequence of the sample contents may be designated by the user so that the sample contents can be reproduced in the designated reproducing sequence. In such a case, it is possible to construct a simplified BGM program. In the case where the data transfer rate of the communication network is not so high, it is not very advantageous to transmit the contents in data streams at step S26 above. Thus, it is advisable to effect the stream transmission at step S26 only when the data transfer rate of the communication network is sufficiently high. Note that the downloaded sample contents stored in the buffer are all deleted when the execution of the dedicated application software 8 is terminated.

"info" button shown in FIG. 7 is a more-information button that shows up on the operation panel in response to selection of desired sample contents or when selected sample contents are being reproduced. By the user clicking this more-information button, the user terminal 2 is caused to request further information, i.e., profile information, of the sample contents being reproduced or under teat-listening by the user, at step S28. For instance, the user terminal 2 may be designed to be automatically connected to the Internet via the conventional WEB browser 9 in response to clicking on the more-information button and then allowed to access (i.e., be automatically linked to) addresses in the profile server 7 where is stored the profile information corresponding to the music piece ID. In response to the access by the user terminal 2, the profile server 7 reads out the profile information corresponding to the music piece ID and transmits the read-out profile information to the user terminal 2, at step S29.

Figure 8:
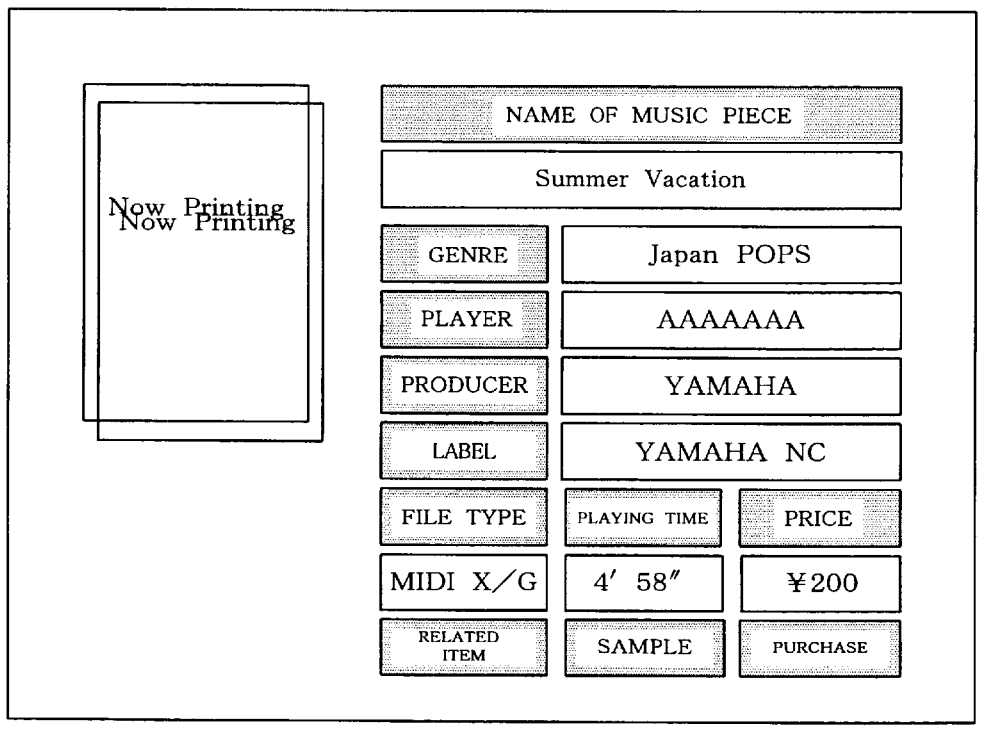
FIG. 8 is a diagram showing another displayed example on the operation panel provided in the user terminal.

Upon receipt of the profile information from the profile server 7, the operation panel in the user terminal 2 is switched to another screen as shown in FIG. 8, where details of the received profile information, such as the name, genre, player, producer, label, file type, playing time and price, of the music piece are displayed. Thus, the user is allowed to purchase the for-sale contents corresponding to the music piece ID, by clicking a purchase button on the screen. In this case, the user can selectively purchase only some, rather than all, of the files included in the for-sale contents; for this purpose, the user may click a related item button. Upon clicking the related item button, a menu of various related items, such as "music piece to be performed", "voice of lyrics", "voice of commentary", "music score", "picture" and "other related music piece", is displayed so that the user can purchase the contents by selectively combining desired ones of the displayed items. After that, by the user clicking the purchase button, a content purchase request is sent from the user terminal 2 to the server 1 at step S30. In accordance with the content purchase request and music piece ID received from the user terminal 2, the server 1 reads out the main section Cc and key information section Ck of the corresponding for-sale contents from the databases 4 and 5 and transmits these sections Cc and Ck to the user terminal 2 at step S31. The user terminal 2 downloads the received for-sale contents, and uses the main and key information sections Cc and Ck to decrypt the encrypted data of the individual files in order to restore them into usable form, at step S32. If purchase of only some of the files has been selected at step S30 above, only the selected files are decrypted into usable form while the remaining, non-selected files are discarded without being decrypted at all. Of course, the present invention is not so limited, and the server 1 may read out only the data of the user-selected files for transmission to the user. In the preferred embodiment, the user convenience can be significantly promoted by thus permitting purchase of only selected ones of the files.

Further, at step S33 of FIG. 6, a process is performed for inserting unique additional information, for each individual purchase, in the files of the purchased for-sale contents. The unique or purchase-specific additional information to be inserted here includes "purchaser information" (client information), "file-specific values" (serial numbers), "date of purchase", "name of site (address) from which the contents are purchased" and the like. The unique additional information may be embedded in the individual files of the purchased for-sale contents either as simple texts or as watermark information. By thus inserting the unique additional information in the purchased for-sale contents, there is provided, on the contents, a kind of inscription indicating that the contents are an authorized purchase. Thus, the inserted unique additional information functions as a guarantee to the user, which provides a warranty of the product valid for a predetermined time period and a guarantee for maintenance services to thereby effectively protect the user. Further, because all contents without such unique additional information can be readily identified as unauthorized products, the insertion of the unique additional information can effectively protect the rights of the content producer and copyright holder against unauthorized copying etc.

Further, depending on the file type, machine ID may be added to the additional information. The machine ID is an ID number unique to the computer used by each user, and each of the files having the machine ID added thereto can be reproduced only on the computer corresponding to that machine ID. Because the MIDI files would become less convenient if the reproducing machine to be used therefor is too limited by addition of the machine ID, no such machine ID had better be imparted to the MIDI files and the unique machine ID may be imparted to each of the audio files and picture/musical score files. Further, in order to prevent a flood of hard copies of the picture or music score file, it is preferable that the names of the copyright holder and purchaser embedded in the picture or music score file be printed out as the picture or musical score file is printed out. In this case, the machine ID may be composed, for example, of the user ID and password so that any change in the hardware of the terminal computer can be properly dealt with. Also note that the additional information may be added to the for-sale contents to be transmitted by the server 1.

It is also important to note that given contents may be purchased at a price lower than the normal price on condition that the purchased contents are not reproduced more than a predetermined number of times. For example, when the user selects a desired one of the related items by clicking the related item button of FIG. 8, a plurality of selling prices may be presented to the user as regards the same for-sale contents so that the user is allowed to select a desired one of the plurality of selling prices. For this purpose, it is only necessary to change the operation of step S30 shown in FIG. 6 accordingly. In this case, once the user's purchase has been confirmed, number-of-reproduction limiting information corresponding to the user-selected selling price is attached to the contents to be sold to the user. For this purpose, it is only necessary to change the operation of step S33 shown in FIG. 6 accordingly; alternatively, the server 1 may embed the number-of-reproduction limiting information in the for-sale contents and then the contents with the number-of-reproduction limiting information may be distributed to the user. After that, the number of reproductions of the contents purchased by the user is managed or controlled such that when the purchased contents have been reproduced by the user the number of times as specified by the number-of-reproduction limiting information recorded as the additional information, the reproduction of the contents is enabled. For example, to control the number of reproduction of the contents, number-of-reproduction data, whose initial value is "0", may be recorded, as rewritable information, in the contents such that the number-of-reproduction data is incremented by one each time the reproduction is effected. Once the recorded number-of-reproduction data has reached the number indicated by the number-of-reproduction limiting information, a visual display or audible announcement may be made to the user which indicates, for example, "no more reproduction is permitted because the predetermined number of times has been reached". Further, at the time of the contents reproduction, a display or announcement may be made to the user which indicates, for example, "reproduction is permitted xxx more times".

It is desirable that the contents be reproduced with the files contained therein appropriately synchronized with each other; such synchronization may be effected using any suitable approach. In the simplest form of synchronization among the MIDI file, audio file and picture file, necessary data may be created with reproducing time data previously embedded therein so that the files can be synchronized with each other spontaneously on condition that reproduction of these files is initiated simultaneously. As another approach, start instructing data may be combined, for example as exclusive data, into the MIDI file at a point thereof when reproduction of the audio file or picture file is to be started, so that the exclusive data is read out, in synchronism with reproduction of the MIDI performance, to allow reproduction of the audio file or picture file to be started. In such a case, the reproduction start point of the audio file or picture file will vary in accordance with a change in the tempo of the MIDI performance.

As another alternative, the respective reproduction timing of the data of the MIDI file, audio file and picture file may be controlled in response to time elapsed from the start of the reproduction, using reproduction schedule management information intended for collectively controlling respective reproduction schedules of all of the above-mentioned files. Because the reproduction tempo of the MIDI file has been fixed in advance, the elapsed time from the beginning of the reproduction and time of each point to be reproduced can be known by adding meta events indicating timing intervals between successive events. In the audio file as well, the elapsed time, for each sample point, from the beginning of the reproduction can be determined because its reproductive sampling frequency has been fixed in advance, and therefore the time of each point to be reproduced can be known. Further, for the picture file, information indicative of the elapsed time from the beginning of the reproduction may be inserted in each frame of picture. In this way, all of the files can be managed collectively using a common time axis from the beginning of the reproduction; thus, even where these files are reproduced by different routines, it is only necessary to adjust the respective reproduced positions of the individual files, whenever necessary, to coincide with each other.

As apparent from the foregoing, the described preferred embodiment of the present invention permit selective reproduction while fast-rewinding or fast-forwarding the data of a plurality of downloaded music pieces as appropriate, by appropriately synchronizing the reproduction of the individual files. Further, with the approach of using the MIDI exclusive data or collectively controlling the reproduction time, it is also possible to readily instruct reproduction of any given portion, such as a measure, within the music piece.

Figure 9A:
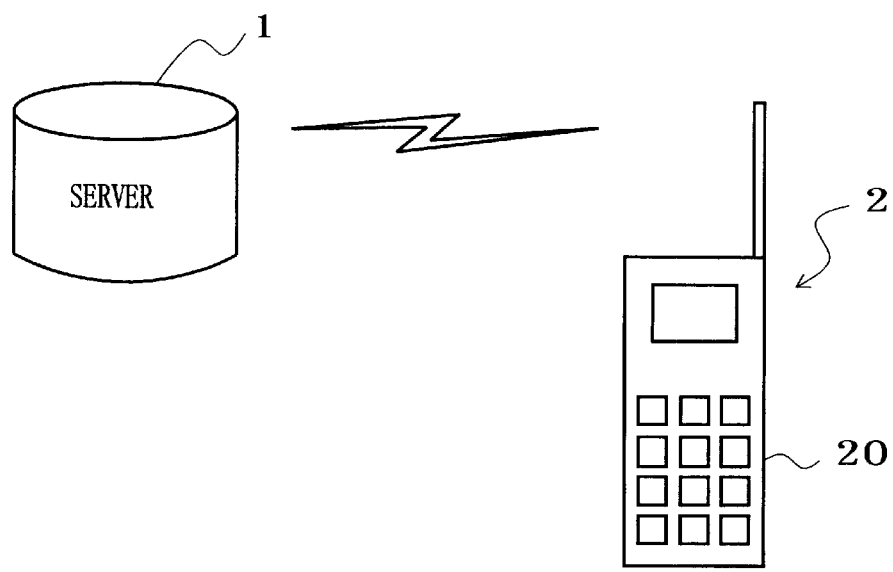
FIG. 9A is a diagram showing an example where the user terminal is a portable-type wireless communication terminal.
Figure 9B:
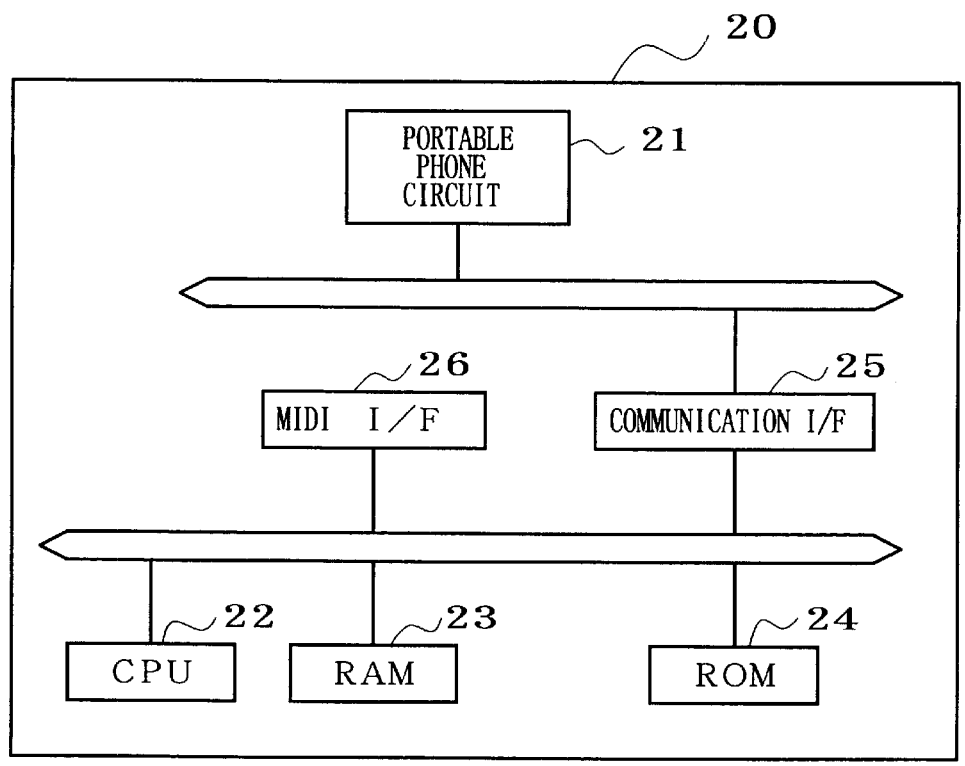
FIG. 9B is a block diagram showing an exemplary inner structure of the portable-type wireless communication terminal shown in FIG. 9A.

As illustratively shown in FIG. 9A, the user terminal (or client station) 2 may be a portable-type wireless communication terminal 20, such as a cellular phone or PHS (Personal Handy Phone System popularly used in Japan) phone. Assume here that the portable-type communication terminal 20 has a suitable tone generating function such as a tone generator or sequencer function. FIG. 9B is a block diagram showing an exemplary inner structure of the portable-type wireless communication terminal 20 having such a tone generating function. The portable-type wireless communication terminal 20 includes a conventional portable phone circuit 21, and a microcomputer installed therein and including a CPU 22, a RAM 23 and a ROM 24. The portable phone circuit 21 and the microcomputer communicate with each other via a communication interface 25. The portable phone circuit 21 has an Internet function and a simplified Internet function. By establishing a radio telephone communication connection between the terminal 20 and the server 1, information communication between the internal microcomputer and the server 1 is permitted via the communication interface 25. Program and data necessary for implementing the tone generating function are prestored in the ROM 24 along with the application software of the present invention. In this case, the ROM 24 may comprise a rewritable memory, such as a flash ROM, so that the tone generating program, data and/or application software of the present invention can be updated whenever necessary.

Let's also assume here that various switches associated with the portable phone circuit 21 are used to perform functions of various input buttons of the terminal 20. In this case, information representing user's switch operation generated by the portable phone circuit 21 is received by the internal microcomputer via the internal communication interface 25, and the above-described various operations are carried out in accordance with input operation signals generated via the microcomputer. Further, various data, such as sample contents or to-be-supplied received from the server 1, are received from the portable phone circuit 21 and passed via the communication interface 25 to the internal microcomputer for storage into the RAM 23. Various data generated via the internal microcomputer are passed via the interface 25 to the portable phone circuit 21 to be visually shown on a display associated with the phone circuit 21. Further, tone reproducing data generated via the internal microcomputer can also be delivered via the communication interface 25 to the portable phone circuit 21 so that they are sounded through an internal speaker of the portable phone circuit 21. The portable-type wireless communication terminal 20 may further include a MIDI interface 26 for exchange of MIDI performance data with the outside. Furthermore, any of tone/tone color data, music piece data, video data etc. received from the server 1 may be stored into an appropriate storage so that it can be used as incoming-call informing melody or picture data or melody to be sounded during a call holding period. Moreover, any of these received tone/tone color data, music piece data, video data etc. may be used as background music or visual image. The portable-type wireless communication terminal 20 is not necessarily limited to the dedicated cellular phone, and it may be any other form of portable equipment, such as a portable navigator, having the function of the cellular phone or a wireless communication function added thereto. Of course, the purchase price of the contents may be settled in any desired manner, such as by prepayment, payment by savings account, credit card and electronic money. Further, it should be obvious that the digital performance information in the present invention may be in any other format than the above-mentioned MIDI format.

According to the present invention having been described so far, each set of the music-containing contents to be distributed or supplied via the communication network is constructed to include not only performance information (e.g., MIDI performance information) of a music piece but also at least sound information pertaining to the music piece, and thus the contents can be significantly diversified. As a consequence, the present invention can effectively arouse users' desire to acquire or purchase the contents.

Further, in the present invention, trial or sample contents including a partial sample of the non-sample regular contents (such as for-sale contents) are supplied separately from the non-sample regular content and the user is advantageously allowed to receive and readily effect test-listening or the like on the received sample contents. Thus, the present invention can effectively motivate the user to acquire (e.g., purchase) the contents and establish an efficient system for the user to ascertain actual details of the content, so that the contents can be easier for the user to use.

Furthermore, with the arrangement that once the user finally decides on acquiring the contents or the intended acquisition has been confirmed, not only the contents are distributed to the user via the communication network but also unique additional information attached to the contents is supplied to the user. By determining the presence of the unique additional information, the present invention can readily guarantee the distributed contents as duly authorized contents. Namely, the present invention can readily provide after-acquisition guarantees such as maintenance services. If a simple unauthorized copy of the contents sold to the user is found, the present invention can accurately identify the authorized purchaser (user) by determining the presence of the unique additional information attached only to the legally purchased contents, and also effectively protect the content supplier and copyright holder etc. from a flood of unauthorized copies.

Further, even in the case where some content stored in the server is stolen by an illegal hacker or the like, or where an unauthorized copy, obtained as by illegally copying acquired contents with the additional information unduly removed from the purchased contents, is found, the present invention can promptly recognize the illegality of the copy by determining that the copy does not have the additional information attached thereto, which is also useful in protecting the rights of the content supplier and copyright holder etc.

Further, according to the method of making sample contents of the present invention, it is possible to automatically determine a range of a music piece to be extracted as strongly characterizing the music piece, taking into account both the digital performance information of the music piece and the sound information (singing voice or chorus voice) pertaining thereto, and thereby can create sample contents with utmost ease and efficiency.

What is claimed is:

1. A method of making sample contents from music contents including at least a file of digital performance information for automatically performing a music piece and a file of sound information contained in the music piece, said method comprising the steps of:

a first step of analyzing the digital performance information for a performance pattern present therein and dividing the digital performance information into a plurality of segments in accordance with the performance pattern;

a second step of detecting an envelope in the sound information and dividing the sound information into a plurality of segments on the basis of a tendency of rising/falling variations in the detected envelope;

a third step of comparing the segments of the digital performance information and the segments of the sound information, to thereby determine a given range of the music piece which is to be extracted as characterizing the music piece; and a fourth step of extracting specific parts of the digital performance information and sound information which correspond to the given range of the music piece determined by said third step and supplying the extracted specific parts as sample contents.

2. A method as claimed in claim 1 wherein said fourth step performs predetermined information processing on the extracted specific parts of the digital performance information and sound information and then supplying, as the sample contents, the specific parts having undergone the predetermined information processing.

3. A method as claimed in claim 2 wherein said predetermined information processing includes performing fade-in and fade-out operations in correspondence with adjoining start and end portions of the digital performance information and sound information.

4. A method as claimed in claim 1 wherein said third step includes:

a step of extracting a representative pattern in the digital performance information on the basis of similarity/dissimilarity between the segments of the performance information;

a step of extracting a representative envelope in the sound information on the basis of the tendency of rising/falling variations in respective envelopes of the segments of the sound information; and a step of determining the given range of the music piece to be extracted such that the given range includes a portion where the representative pattern and the representative envelope overlap each other.

5. An apparatus for making sample contents from music contents including at least a file of digital performance information for automatically performing a music piece and a file of sound information contained in the music piece, said apparatus comprising:

a memory storing music contents; and a processor coupled with said memory, said processor being adapted to:

read out, from said memory, the digital performance information and sound information included in desired music contents;

analyze the digital performance information for a performance pattern present therein and divide the digital performance information into a plurality of segments in accordance with the performance pattern;

detect an envelope in the sound information and divide the sound information into a plurality of segments on the basis of a tendency of rising/falling variations in the detected envelope;

compare the segments of the digital performance information and the segments of the sound information, to thereby determine a given range of the music piece which is to be extracted as characterizing the music piece; and extract specific parts of the digital performance information and sound information which correspond to the given range of the music piece and supply the extracted specific parts as sample contents.

6. A machine-readable storage medium containing a group of instructions to cause a processor to implement a method of making sample contents from music contents including at least a file of digital performance information for automatically performing a music piece and a file of sound information contained in the music piece, said method comprising the steps of:

a first step of analyzing the digital performance information for a performance pattern present therein and dividing the digital performance information into a plurality of segments in accordance with the performance pattern;

a second step of detecting an envelope in the sound information and dividing the sound information into a plurality of segments on the basis of a tendency of rising/falling variations in the detected envelope;

a third step of comparing the segments of the digital performance information and the segments of the sound information, to thereby determine a given range of the music piece which is to be extracted as characterizing the music piece; and a fourth step of extracting specific parts of the digital performance information and sound information which correspond to the given range of the music piece determined by said third step and supplying the extracted specific parts as sample contents.

* * * * *